(12) United States Patent
Devenney et al.

(10) Patent No.: US 7,485,390 B2
(45) Date of Patent: Feb. 3, 2009

(54) COMBINATORIAL METHODS FOR PREPARING ELECTROCATALYSTS

(75) Inventors: Martin Devenney, Mountain View, CA (US); Konstantinos Chondroudis, Sunnyvale, CA (US); Alexander Gorer, San Jose, CA (US)

(73) Assignee: Symyx Technologies, Inc.

( * ) Notice: Subject to any disclaimer, the term of this patent is extended or adjusted under 35 U.S.C. 154(b) by 762 days.

(21) Appl. No.: 10/777,482

(22) Filed: Feb. 12, 2004

(65) Prior Publication Data

US 2005/0050994 A1    Mar. 10, 2005

Related U.S. Application Data

(60) Provisional application No. 60/447,089, filed on Feb. 12, 2003.

(51) Int. Cl.
*H01M 4/00* (2006.01)
*H01M 8/08* (2006.01)
*H01M 8/14* (2006.01)
*B01J 23/00* (2006.01)
*B01J 21/00* (2006.01)

(52) U.S. Cl. .................. 429/40; 429/44; 502/182; 502/184; 502/185; 502/325; 502/326; 502/327; 502/331; 502/339; 502/345

(58) Field of Classification Search .............. 502/182, 502/184, 185, 319, 321, 325, 326, 327, 331, 502/345; 75/351, 370; 429/40, 44
See application file for complete search history.

(56) References Cited

U.S. PATENT DOCUMENTS

| 3,357,819 | A |   | 12/1967 | Landsberg |        |
|-----------|---|---|---------|-----------|--------|
| 3,382,062 | A | * | 5/1968  | Hiller    | 75/344 |
| 3,535,103 | A | * | 10/1970 | Whitfield | 75/351 |
| 3,902,917 | A |   | 9/1975  | Baresel et al. |   |
| 3,916,532 | A |   | 11/1975 | Jaeger et al. |    |
| 4,001,944 | A |   | 1/1977  | Williams  |        |
| 4,454,169 | A |   | 6/1984  | Hinden et al. |    |
| 4,507,401 | A |   | 3/1985  | DuBois et al. |    |

(Continued)

FOREIGN PATENT DOCUMENTS

EP        0 129 399 A1    12/1984

(Continued)

OTHER PUBLICATIONS

K.Y. Chen, "Preparation and Characterization of High-Performance Pt-Ru/WO$_3$/C Anode Catalysts for the Oxidation of Impure Hydrogen," Electrochemical and Solid State Letters, 2000, 3 (1), p. 10-12.

(Continued)

*Primary Examiner*—Cam N. Nguyen
(74) *Attorney, Agent, or Firm*—Armstrong Teasdale LLP (57) ABSTRACT

The present invention is directed to a method for forming combinatorial libraries comprising arrays of materials prepared by depositing a metal species on a support for use as catalysts, such as electrocatalysts. The invention is also directed to combinatorial libraries comprising an array of such metal-containing supported catalysts. These catalyst-containing libraries are particularly well-suited for use in conducting combinatorial research investigations, in particular with respect to electrocatalysts for fuel cells.

12 Claims, 1 Drawing Sheet

U.S. PATENT DOCUMENTS

| | | | |
|---|---|---|---|
| 4,536,482 A | 8/1985 | Carcia | |
| 4,615,736 A | 10/1986 | Armor et al. | |
| 4,716,087 A * | 12/1987 | Ito et al. | 429/40 |
| 4,822,699 A * | 4/1989 | Wan | 429/40 |
| 4,915,905 A | 4/1990 | Kampe et al. | |
| 5,055,441 A | 10/1991 | McCarron, III et al. | |
| 5,192,735 A | 3/1993 | Pagotto et al. | |
| 5,480,851 A | 1/1996 | Tsurumi et al. | |
| 5,776,359 A | 7/1998 | Schultz et al. | |
| 5,964,918 A * | 10/1999 | Asada et al. | 75/351 |
| 5,985,356 A | 11/1999 | Schultz et al. | |
| 6,004,617 A | 12/1999 | Schultz et al. | |
| 6,030,921 A * | 2/2000 | Ziemer | 502/325 |
| 6,033,624 A * | 3/2000 | Gonsalves et al. | 419/48 |
| 6,066,410 A | 5/2000 | Auer et al. | |
| 6,184,428 B1 | 2/2001 | Zahoor et al. | |
| 6,326,098 B1 | 12/2001 | Itoh et al. | |
| 6,348,431 B1 | 2/2002 | Even, Jr. | |
| 6,464,750 B1 * | 10/2002 | Tailhades et al. | 75/246 |
| 6,498,121 B1 | 12/2002 | Gorer | |
| 6,514,903 B2 | 2/2003 | Lin et al. | |
| 6,517,965 B1 | 2/2003 | Gorer | |
| 6,627,571 B1 | 9/2003 | Lugmair et al. | |
| 6,699,305 B2 * | 3/2004 | Myrick | 75/351 |
| 6,719,821 B2 * | 4/2004 | Yadav et al. | 75/343 |
| 6,723,678 B2 | 4/2004 | Gorer | |
| 6,887,296 B2 * | 5/2005 | Mende et al. | 75/351 |
| 6,921,605 B2 * | 7/2005 | Gorer | 429/40 |
| 6,932,851 B2 * | 8/2005 | Bocarsly et al. | 75/351 |
| 7,097,686 B2 * | 8/2006 | Chandler et al. | 75/331 |
| 7,101,639 B2 * | 9/2006 | Gorer et al. | 429/40 |
| 7,169,731 B2 * | 1/2007 | Chondroudis et al. | 502/185 |
| 2001/0027160 A1 | 10/2001 | Lee et al. | |
| 2002/0066338 A1 * | 6/2002 | Shekhter et al. | 75/245 |
| 2002/0132040 A1 | 9/2002 | Finkelshtain et al. | |
| 2003/0000340 A1 * | 1/2003 | Mende et al. | 75/351 |
| 2003/0008197 A1 * | 1/2003 | Gorer | 429/40 |
| 2003/0104936 A1 | 6/2003 | Mao et al. | |
| 2003/0140731 A1 * | 7/2003 | Bocarsly et al. | 75/370 |
| 2003/0186109 A1 * | 10/2003 | Huang et al. | 429/44 |
| 2003/0232235 A1 * | 12/2003 | Gorer et al. | 429/44 |
| 2004/0073096 A1 | 4/2004 | Kates et al. | |
| 2004/0137310 A1 | 7/2004 | Kiros | |
| 2004/0166396 A1 * | 8/2004 | Gorer | 429/40 |
| 2005/0037920 A1 | 2/2005 | Devenney et al. | |
| 2005/0115362 A1 * | 6/2005 | Virkar et al. | 75/345 |
| 2005/0170222 A1 * | 8/2005 | Strasser et al. | 429/13 |
| 2005/0227128 A1 * | 10/2005 | Devenney et al. | 429/20 |
| 2006/0019825 A2 | 1/2006 | Devenney et al. | |

FOREIGN PATENT DOCUMENTS

| | | |
|---|---|---|
| EP | 0 552 587 A1 | 7/1993 |
| EP | 1 254 712 A1 | 11/2002 |
| FR | 2 315 318 A1 | 1/1977 |
| FR | 2315318 A1 | 1/1977 |
| WO | WO 03/069706 A2 | 8/2003 |
| WO | WO 03/077337 A1 | 9/2003 |
| WO | WO 03/081702 A2 | 10/2003 |
| WO | 2004073096 A1 | 8/2004 |

OTHER PUBLICATIONS

D. Chu and S. Gilman, "Methanol Electro-oxidation on Unsupported Pt-Ru Alloys at Different Temperatures," J. Electrochem. Soc., 1996, 143 (5), p. 1685-1690.

T.R. Ralph and M.P. Hogarth, "Catalysis for Low Temperature Fuel Cells Part 1: The Cathode Challenges," Platinum Metals Rev., 2002, 46 (1), p. 3-14.

International Search Report for Application No. PCT/US2004/004545, dated Jul. 29, 2004.

* cited by examiner

FIG. 1

COMBINATORIAL METHODS FOR PREPARING ELECTROCATALYSTS

REFERENCE TO RELATED APPLICATION

This application claims priority from U.S. Provisional Application Ser. No. 60/447,089, filed Feb. 12, 2003. The entire contents of this provisional application is incorporated herein by reference.

BACKGROUND OF THE INVENTION

1. Field of the Invention

The present invention is generally directed to a method for forming combinatorial libraries comprising arrays of materials prepared by depositing a dissolved metal on a support for use as catalysts, such as electrocatalysts. The invention is also directed to combinatorial libraries comprising an array of such metal-containing supported catalysts. These catalyst-containing libraries are particularly well-suited for use in conducting combinatorial research investigations, in particular with respect to electrocatalysts for fuel cells.

2. Background Information

A fuel cell is an electrochemical device for directly converting the chemical energy generated from an oxidation-reduction reaction of a fuel such as hydrogen or hydrocarbon-based fuels and an oxidizer such as oxygen gas (e.g., in air) supplied thereto into a low-voltage direct current. For the oxidation and reduction reactions in a fuel cell to proceed at useful rates, especially at operating temperatures below about 300° C., electrocatalyst materials are typically supplied at the electrodes. Initially, fuel cells used electrocatalysts made of a single metal, usually platinum (Pt), palladium (Pd), rhodium (Rh), iridium (Ir), osmium (Os), silver (Ag) or gold (Au) because they are able to withstand the corrosive environment, platinum being the most efficient and stable single-metal electrocatalyst for fuel cells operating below about 300° C. Although platinum is the most efficient and stable single-metal electrocatalyst for fuel cells, it is costly and an increase in electrocatalyst activity over platinum is generally considered to be necessary for wide scale commercialization of fuel cell technology. An improvement in catalysts may take many forms such as increased activity, increase corrosion resistance, increased poison tolerance, and/or decreased costs. For example, increased tolerance to CO has been reported by alloying platinum and ruthenium at a 50:50 atomic ratio (see, D. Chu and S. Gillman, J. Electrochem. Soc. 1996, 143, 1685). Ideally, a reduction in cost will accompany an improvement in one or more of the preceding performance characteristics.

Fuel cell electrocatalysts were first used in fuel cells in metallic powder form. However, techniques have been developed to disperse these metals over the surface of electrically conductive supports (e.g., carbon black) to increase the surface area of the electrocatalyst which in turn increased the number of reactive sites leading to improved efficiency of the cell.

Combinatorial materials science is known in the art, and generally comprises library design, library synthesis, optionally characterization of one or more members of the library, and library screening. In particular, combinatorial materials science, or more specifically combinatorial chemistry, refers generally to methods for synthesizing a collection of chemically diverse materials and to methods for rapidly testing or screening this collection of materials for desirable performance characteristics and properties.

Combinatorial chemistry approaches have greatly improved the efficiency of discovery of useful materials. For example, material scientists have developed and applied combinatorial chemistry approaches to discover a variety of novel materials, including for example, high temperature superconductors, magnetoresistors, phosphors and catalysts. (See, for example, U.S. Pat. No. 5,776,359 to Schultz et al.) In comparison to traditional materials science research, combinatorial materials research can effectively evaluate much larger numbers of diverse compounds in a much shorter period of time.

Although such high-throughput synthesis and screening methodologies are conceptually promising, substantial technical challenges exist for application thereof to specific research and commercial goals. For example, the known approaches for preparing combinatorial libraries have not been particularly adapted for preparing supported catalysts, especially supported electrocatalysts having relatively high metal loadings, and especially both relatively high metal loadings and relatively narrow particle size distribution.

BRIEF SUMMARY OF THE INVENTION

Briefly, therefore, the present invention is directed to a method for forming combinatorial libraries of supported metal-containing powders. The method comprises providing or preparing an array comprising a plurality of dispersions, each of which comprises support particles dispersed in a solution comprising a solvent and a dissolved metal. Heat is removed concurrently from each of the plurality of dispersions to precipitate the dissolved metal from each of the solutions on said support particles for each of the plurality of dispersions. The solution and support particles (having thereon said precipitated metal) are then separated for each of the plurality of dispersions to yield an array comprising a plurality of supported metal-containing powders.

The present invention is also directed to a method for forming combinatorial libraries of supported metal-containing powders which comprises providing or preparing an array comprising a plurality of dispersions, each of which comprises support particles dispersed in a solution comprising a solvent and a dissolved metal. Heat is removed concurrently from each of the plurality of dispersions to precipitate the dissolved metal from each of the solutions on said support particles for each of the plurality of dispersions and to freeze each of the solutions, wherein heat is removed from each of the plurality of dispersions by contacting a container in which each of the plurality of dispersion is contained with a cryogenic liquid. The frozen solutions and support particles (having thereon said precipitated metal) are then separated for each of the plurality of dispersions by freeze-drying to yield an array comprising a plurality of supported metal-containing powders.

The present invention is also directed to a method for forming a combinatorial library of freeze-dried, metal-containing powders which comprises providing or preparing an array comprising a plurality of dispersions, each of which comprises support particles dispersed in a solution comprising a solvent and a dissolved metal. Heat is removed concurrently from each of the plurality of dispersions to precipitate the dissolved metal from each of the solutions on said support particles and to form a plurality of composites that comprise the supports and the precipitated metal thereon within a matrix that comprises the solvent in a solid state. Each of the plurality of composites are then freeze-dried to separate the supports (having thereon the precipitated metal) and the solvent to yield an array comprising a plurality of supported metal-containing powders.

It is to be noted that, in some instances, the dissolved metal is an inorganic metal-containing compound, and the deposits resulting therefrom are precursors which are converted, following freeze-drying, concurrently to metal deposits for each of the plurality of freeze-dried powders.

It is to be further noted that, in some instances, more than one dissolved metal may be precipitated onto the supports. Additionally, upon separation of this support (having deposited thereon two different metals), this support may be subjected to appropriate conditions in order to alloy the precipitated metals thereon.

In this regard it to be further noted that, alternatively or additionally, the support may have a metal deposited or precipitated thereon, prior to formation of the dispersion. As such, this pre-deposited metal may be alloyed with the metal deposited or precipitated on the support, as part of the processes described above.

The present invention is also directed to a method for forming a combinatorial library of carbon-supported, platinum alloys. The method comprises providing or preparing an array comprising a plurality of dispersions, each of the plurality of dispersions comprising carbon supports and platinum in its metallic oxidation state, in a solution that comprises a solvent and a dissolved non-platinum metal. Heat is removed concurrently from each of the plurality of dispersions in the array to precipitate the dissolved, non-platinum metal from the solution onto the carbon supports. In one instance, a plurality of composites are formed as a result of heat removal, each of which comprises the supports and the precipitated metal thereon within a matrix that comprises the solvent in a solid state. In this instance, or alternatively, heat is removed from each of the plurality of dispersions by contacting a container in which each of the plurality is contained with a cryogenic liquid. The solvent and the supports having the precipitated metal thereon are then separated by freeze-drying. An array comprising a plurality of supported alloys is then formed, each alloy comprising metals derived from the platinum metal and the precipitated, non-platinum metal.

In one preferred embodiment of the above-described methods, each of the dispersions in the array is prepared by a method comprising dispersing the support particles in a solution comprising a solvent and a first, and/or second, dissolved metal (as the case may be).

In this or another preferred embodiment of the above-described methods, each of the plurality of dispersions preferably has a volumetric ratio of support particles to solution of at least about 1:10.

Each of the above-described methods is preferably effected with each of the plurality of dispersions being prepared at separate, spatially discrete regions of a common library substrate. In particularly preferred embodiments, a universal common substrate is employed, in which the preparation of each of the plurality of dispersions, and one or more of the subsequent steps, are effected on the same common library substrate (i.e., without having to transfer members of the array off of the original preparation substrate).

The present invention is also directed to a combinatorial library comprising supported metal alloys. The library comprises an array comprising a plurality of different supported metal alloys, each of which comprises (i) a support, (ii) a deposit comprising a metal alloy thereon, wherein the metal alloy comprises a non-noble metal, (iii) a loading of deposits on the supports of at least about 20 weight percent, (iv) an average deposit size that is no greater than about 10 nm, and (iv) a deposit size distribution wherein at least about 70 percent of the metal alloy deposits are between about 50 and about 150 percent of the average metal alloy deposit size, the plurality of supported metal alloy members of the array being different from each other with respect to one or more characterizing features selected from the group consisting of: (a) chemical or physical properties of the supports; (b) chemical or physical properties of the metal alloy on the supports; (c) the extent of loading of the deposits on the supports; and (d) the average deposit size on the supports.

The present invention is also directed to an apparatus for combinatorially screening materials for use as a fuel cell electrode. The apparatus comprises an array comprising a plurality of fuel cell electrodes, with each fuel cell electrode member of the array comprising a supported electrocatalyst powder and an electrode substrate upon which the supported electrocatalyst powder is deposited. The supported electrocatalyst powder comprises (i) supports, (ii) deposits comprising a metal alloy on the supports, wherein the metal alloy comprises a non-noble metal, (iii) a loading of deposits on the supports of at least about 20 weight percent, (iv) an average deposit size that is no greater than about 10 nm, and (v) a deposit size distribution wherein at least about 70 percent of the metal alloy deposits are between about 50 and about 150 percent of the average metal alloy deposit size, wherein the supported electrocatalyst alloy powders of the plurality of fuel cell electrodes of the array are different from each other with respect to one or more characterizing features selected from the group consisting of: (a) chemical or physical properties of the supports; (b) chemical or physical properties of the metal alloy on the supports; (c) the extent of loading of the deposits on the supports; and (d) the average deposit size on the supports.

The present invention may be used in connection with research involving one or more fuel cells, where each fuel cell comprises an anode, a cathode, a proton exchange membrane between the anode and the cathode, a supported electrocatalyst powder for the catalytic oxidation of a hydrogen-containing fuel or the catalytic reduction of oxygen. The fuel cell is preferably characterized in that the supported electrocatalyst powder is as set forth immediately above.

Advantageously, the preparation methods or protocols described herein enable a combinatorial materials preparation approach that is advantaged relative to previously-known protocols or methods for preparing supported catalyst materials, and especially supported electrocatalyst materials. For example, the ability to provide relatively concentrated metal solutions allows for manipulation of smaller volumes of dispersions or suspensions, while still achieving relative high metal loadings, and preferably also relatively narrow particle size distributions.

The foregoing and other features and advantages of the present invention will become more apparent from the following description and accompanying drawing.

DETAILED DESCRIPTION OF THE INVENTION

In the present invention, methods and systems having features that enable an effective combinatorial materials science research program for supported catalysts, such as supported electrocatalysts, is provided. Such a research program may be directed, for example, to identifying or optimizing materials that enhance a chemical process, especially an electrochemical process, or to other research goals, such as process characterization or optimization for processes such as electrochemical processes. The methods of the invention, or the combinatorial libraries of the invention, or both, may be advantageously used in a process of generating data for an array of supported catalysts such as supported electrocatalysts. Hence, the present invention also specifically includes use of the combinatorial methods as described or claimed herein, or use of the combinatorial libraries as described or claimed herein, in a process for generating data for an array of supported catalysts, such as supported electrocatalysts. The systems, devices and methods disclosed herein can also be adapted to the production of small quantities of supported catalysts such as electrocatalysts.

Combinatorial research methodologies are applied to form one or more combinatorial libraries comprising library elements that are supported metal species (e.g., a metal precipitated on a particulate support, as described herein). Generally, the method comprises providing or preparing an array comprising a plurality of dispersions, each of the plurality of dispersions comprises support particles (also referred to herein as "supports" or "particulate support") dispersed in a solution comprising a solvent and a dissolved metal, removing heat concurrently from each of the plurality of dispersions to precipitate the dissolved metal from the solution on said support particles for each of the plurality of dispersions; and, separating said solution and support particles, which have thereon said precipitated metal, for each of the plurality of dispersions to obtain an array comprising a plurality of supported metals (e.g., powders).

With respect to each member of the combinatorial library, the method of the present invention more particularly comprises forming a dispersion comprising a solution and support particles (also referred to as "supports" and as a "particulate support") dispersed therein, wherein the solution comprises a solvent portion and a solute portion that comprises the constituents of the metal species being deposited (e.g., a dissolved metal from a metal-containing compound that is dissolved). Heat is removed from the dispersion to precipitate the metal species or dissolved metal onto the supports or the particulate support. Typically, the precipitation of the dissolved metal depletes the solute (e.g., the dissolved metal and/or the dissolved metal-containing compound) from the liquid (i.e., a solvent). The supports or the particulate support having the metal species or precipitated metal thereon are separated from the solution. The separation may be accomplished by, for example, filtration, evaporation, sublimation, or a combination thereof.

In one preferred embodiment of present invention, the method for each member of the combinatorial library can comprise forming a dispersion or suspension comprising a solution and supports or a particulate support suspended therein, wherein the solution comprises a solvent portion and a solute portion that comprises the constituents of the metal species being deposited (e.g., a dissolved metal). Heat is removed from the solution to deposit (e.g., precipitate) the metal species (e.g., the dissolved metal) onto the supports or the particulate support and to solidify the suspension by freezing the solution. The solidified suspension is freeze-dried to separate the solvent portion and leave a freeze-dried powder comprising the supports/particulate support and the deposits of the metal species/precipitated metal on the supports.

As indicated above, the present invention is particularly useful for the production of supported metal powders for use as electrocatalysts. Specifically, in one embodiment of the present invention, each member of the combinatorial array may be prepared as follows. Deposits comprising one or more inorganic metal-containing compounds are deposited on supports (e.g., carbon supports or a particulate carbon support). The deposited inorganic metal-containing compounds are subjected to a thermal treatment to decompose them into metal ions and volatilized material, to reduce the metal ions to their metallic oxidation state (e.g., the average valency is at or near zero), and to alloy the metal atoms, if multiple metals are present. Although there may be portions of the catalyst wherein the oxidation states of one or more of the metals may be greater than about zero, the average oxidation state of each of these elements throughout the entire catalyst is less than the lowest commonly occurring oxidation state for that particular element (e.g., the lowest commonly occurring oxidation state for platinum and ruthenium is 2). Therefore, the average oxidation states of the platinum and/or ruthenium may be, in order of increasing preference, less than 1, 0.5, 0.1, or 0.01, or even zero.

The resulting "end-product" finished stage combinatorial library comprises library elements that are candidate materials that are, or that comprise, a supported metal or metal alloy powder comprising the supports and deposits of the metal alloy on the supports. Typically, for each library member, the metal or metal alloy deposits are substantially smaller than the supports. For example, the metal or metal alloy deposits are generally referred to as nanoparticles because they have a size (i.e., a maximum cross-sectional length) that is no greater than about 20 nm, 10 nm, 5 nm, 2 nm or smaller, whereas the supports typically have an average size that is greater than about 100 nm, and more typically between about 200 and 300 nm. The following disclosure is primarily directed to such an embodiment, however, it is to be understood that this is not intended to limit the applicability of the present invention. For example, the present invention is applicable for forming intermediate libraries, in which with respect to each library member, a metal species is deposited without a subsequent conversion (e.g., reduction) of the metal species or precipitated metal to another material (e.g., a metal in its metallic oxidation state). The present invention is also applicable for forming, with respect to each library member, deposits of a metal species or precipitated metal that are not converted to another material and/or for forming deposits of a metal species or precipitated metal that may be converted to something other than a reduced metal or metal alloy. For example, a deposited metal species or precipitated metal may be converted to an oxide, a carbide, a nitride, a sulfide, etc, by means known in the art.

Combinatorial Preparation of Library Members

Preferably, the various steps of the preparation protocol (as generally described above, and as more particularly described below) are effected concurrently (i.e., simultaneously or in parallel), with at least some overlap in time (even if not entirely coincident in time with respect to both starting and/or finishing times) for each of a plurality of library members of the array (i.e., for at least about two, about five or more library members of the array) for a particular step in the protocol.

Preferably, for example, the removal of heat or freezing steps are effected concurrently for each of a plurality of library members. Additionally, or alternatively, a plurality of dispersions or suspensions of the array are preferably prepared concurrently for each of a plurality of library members. Additionally or alternatively, the solution and the support particles having a precipitated metal thereon may be separated (e.g., by freeze drying, such as via sublimation) concurrently for each of a plurality of library members. Additionally or alternatively, a first and a second precipitated metal may be alloyed concurrently for each of a plurality of supported metal alloys, or precursors thereof. Additionally, or alternatively, precursor deposits may be converted or reduced concurrently to metal (in its metallic oxidation state) for each of a plurality of freeze-dried powders. In the aforementioned particularly preferred embodiment, reduced metals and platinum pre-deposits, as described elsewhere herein, may be alloyed concurrently for each of a plurality of freeze-dried powders. In some embodiments, the concurrent processing of each of the plurality of library members may be effected for at least two, preferably for at least three and most preferably all of the aforementioned various stages of the protocol.

It is to be noted that various process parameters of the preferred protocol can also be varied. For example, one or more of the following steps may be varied, independently from each other, or collectively in each of the various combinations and permutations:

1. The chemical or physical properties of the supports (or support particles) may be varied as compared between different dispersions or suspensions of the array. As a non-limiting example, the chemical composition, the porosity, pore volume, the adsorptivity, the hydrophobicity, the hydrophilicity, or other properties of the support may be varied, preferably systematically over the members of the library.
2. Additionally or alternatively, the chemical composition, stoichiometry or concentration, or relative amounts (including relative volume ratio of support particles to solution) of the metal species or inorganic metal-containing compound (in each case, that is dissolved in the solvent or solution or that forms the solute portion of the solution) may be varied as compared between different dispersions or suspensions of the array.
3. Additionally or alternatively, the chemical composition of the solvent or solvent portion of the solution (including the relative ratio of co-solvents) may be varied as compared between different dispersions or suspensions of the array.
4. Additionally or alternatively, the rate of heat removal from each of the plurality of dispersions or suspensions (i.e., the rate at which these cool), or the rate of freezing of each of the plurality of dispersions or suspensions, may be varied, and preferably may be independently and controllably varied as compared between different library members (and, for example, as between different regions of a library substrate); that is, as between different dispersions or suspensions of the array. Similarly, the relative temporal profiles of such heat removal or of such freezing may be varied, and preferably independently and controllably varied, in each case as compared between different dispersions or suspensions of the array.
5. Additionally or alternatively, the overall period of time during which heat is removed from each of the plurality of dispersions or suspensions (i.e., the rate at which these cool), or during which freezing occurs for each of the plurality of dispersions or suspensions, may be varied, and preferably independently and controllably varied, in each case as compared between different dispersions or suspensions of the array.
6. Additionally or alternatively, the overall amount of heat energy removed during the steps in which heat is removed from each of the plurality of dispersions or suspensions (i.e., the rate at which these cool), or during the steps in which freezing occurs for each of the plurality of dispersions or suspensions, may be varied, and preferably independently and controllably varied, in each case as compared between different dispersions or suspensions of the array.

Other process parameters can also be varied, as apparent to persons of skill in the art. Generally, in a preferred approach, one or more of process conditions or parameters that have an affect on one or more steps of the protocol, including for example those conditions specifically identified in the immediately preceding paragraphs, may be controllably varied to identify preparation protocols or process conditions or both, that are effective for forming deposits of a desired or selected size or range of sizes, or for a desired size distribution or range of size distributions, or for some other desired characteristic or feature of the supported catalyst material. For example, one or more of process conditions or parameters may be controllably varied to identify preparation protocols or process conditions or both, that are effective for forming deposits (e.g., of a metal species, a metal-containing compound, a metal-precursor, etc., as described elsewhere herein), of a desired size selected from the group consisting of: less than about 20 nm, less than about 10 nm, less than about 5 nm, and less than about 3 nm. As another example, one or more of process conditions or parameters may be controllably varied to identify preparation protocols or process conditions or both, that are effective for forming deposits of a size greater than about 1 nm, or preferably greater than about 2 nm. Further, one or more of process conditions or parameters may be controllably varied to identify preparation protocols or process conditions or both, that are effective for forming deposits having a size distribution within the range of one of the size distributions set forth elsewhere herein.

As described in further detail below, the method of the invention generally includes the preparation or the provision of an array of candidate materials as library elements or library members (used interchangeably herein) where the array comprises a plurality of dispersions or suspensions, preferably at spatially discrete regions of a common library substrate. The plurality of dispersions or suspensions can in some embodiments be in separate containers supported, for example at discrete regions, on a common library substrate. Each of the plurality of dispersions or suspensions may be contained in separate open-ended containers, or in alternative embodiments, may be contained in separate closed containers, such as separate hermetically sealed containers, including if desired for processing, containers that may be pressurized to above atmospheric pressure, and in some cases pressurized for example to above about 10 psig, above about 25 psig, or even above about 50 psig. As discussed below, in some embodiments, the common library substrate may be a microtiter plate or other type of substrate comprising regions defined by wells having a region density of not more than about one region per $cm^2$. Hence, as described elsewhere herein, for example, the step of removing heat or the step of freezing the plurality of dispersions or suspensions may be effected while the plurality of dispersions or suspensions are at spatially discrete regions of a common library substrate. Additionally or alternatively, the step of separating the solution and the supports or the support particles for each of the plurality of dispersions or suspensions may be effected while the plurality of dispersions or suspensions are at spatially discrete regions of a common library substrate. Additionally or alternatively, the plurality of composites may be freeze-dried while the plurality of composites are at spatially discrete regions of a common library substrate. Additionally or alternatively, the first and second metal species may be alloyed while the plurality of supported metal alloy precursors are at spatially discrete regions of a common library substrate.

In preferred approaches, a work flow is provided such that the various process steps of the protocol of the invention, as generally described above and as described in more detail elsewhere herein, may be efficiently coupled. In one approach, a universal common library substrate is provided such that the array of library members may be marshaled through at least two consecutive steps of the process on the same common library substrate, without having to transfer the individual members of the library off of a library substrate and/or onto a library substrate. Such universal common library substrate offers unique advantages in applying combinatorial approaches to the preparation protocols of the invention. For example, the plurality of dispersions or suspensions may be prepared on a universal common library substrate that is the same library substrate on which the plurality of dispersions or suspensions reside during the step of removing heat or the step of freezing the plurality of dispersions or suspensions. Similarly, the plurality of dispersions or suspensions are prepared on a universal common library substrate that may be the same library substrate on which the plurality of dispersions or suspensions reside during the step of separating the solution and the supports or the support particles. Additionally or alternatively, the plurality of dispersions or suspensions are prepared on a universal common library substrate that may be the same library substrate on which the plurality of composites are freeze-dried. Additionally or alternatively, the plurality of dispersions or suspensions are prepared on a universal common library substrate that may be the same library substrate on which the plurality of composites or precipitates or deposits are alloyed. Other various combinations and subcombinations of universality of the common library substrate as between any two or more consecutive process steps are also considered within the scope of the invention.

In any case, and generally, according to one approach for identifying useful supported catalysts (or more generally supported metal-containing powders), such as supported electrocatalysts, a large compositional space of potential candidate materials, or a large process space of potential processing parameters, may be rapidly explored through the preparation and evaluation of candidate material libraries. Such candidate material libraries can comprise, for example, compositional gradients of two or more components, such as binary compositional gradients of components A and B, ternary compositional gradients of components A, B, and C, or higher-order compositional gradients. Candidate material libraries could alternatively comprise compounds having a number of structural variations such as different crystalline structures, different alloy compositions, different deposit morphologies, etc., relative to other members of the library, such that the compounds in the library share some common chemical or physical properties, but also have some diversity with respect to a chemical or physical property.

In an initial, primary screening, candidate materials may be rapidly prepared for evaluation over a large compositional space or over a large process space according to the systems, devices and methods of the present invention to provide valuable preliminary data and, optimally, to identify several "hits"; that is, particular candidate materials or sets of process conditions that have or result in characteristics that meet or exceed certain predetermined metrics (e.g., performance characteristics, properties, etc.). Such metrics may be defined, for example, by the characteristics of the then best known material for the chemical process of interest. The first candidate material libraries run through a primary screening can comprise, for example, full-range compositional gradients having compositional ratios ranging from 0% to 100% for each component. Because local performance maxima may be located at compositions between those particular compositions evaluated in the primary screening of the first libraries, it may be advantageous to screen more focused libraries (e.g., libraries focused on a smaller range of compositional gradients, or libraries comprising compounds having incrementally smaller structural variations relative to those of the identified hits). Hence, the primary screen may be used reiteratively to explore localized and/or optimized compositional space in greater detail. The preparation and evaluation of more focused libraries can continue as long as the high-throughput primary screen can meaningfully distinguish between neighboring library compositions or compounds.

Once one or more hits have been satisfactorily identified based on the primary screening, libraries having candidate materials focused around the primary-screen hits may be evaluated with a secondary screen; that is, a screen designed to provide (and typically verified, based on known materials, to provide) chemical process conditions that may be scaled up with a greater degree of confidence than those applied in the primary screen. Particular candidate materials having characteristics that surpass the predetermined metrics for the secondary screen may then be considered to be a "lead" material. If desired, additional libraries comprising candidate materials focused about such lead materials may be screened with additional secondary screens. Identified lead materials may be subsequently developed for commercial applications through traditional bench-scale and/or pilot scale experiments.

While the concept of primary screens and secondary screens as outlined above provides a valuable combinatorial research model for many materials of interest and for many chemical processes, a secondary screen may not be necessary for certain chemical processes where primary screens provide an adequate level of confidence as to scalability and/or where market conditions warrant a direct development approach. Similarly, where optimization of materials having known properties of interest is desired, it may be appropriate to start with a secondary screen. In general, the systems, devices and methods of the present invention may be applied as either a primary or a secondary screen for one or more libraries of candidate materials, to identify candidate materials that enhance the chemical process of interest.

Combinatorial Libraries

Generally, the combinatorial libraries of the invention comprise an array of materials, preferably an array of supported catalysts (or more generally an array of supported metal-containing powders), such as supported electrocatalysts, at spatially discrete regions of a common library substrate. Alternatively or additionally, the library may comprise, for example, an array comprising a plurality of dispersions or suspensions, as described herein.

The array of materials preferably comprises supported catalysts such as supported electrocatalysts that are different from other members of the library. In any case, particular candidate materials that are the library members are considered to be different from other candidate material library members if they comprise different chemical properties (e.g., are chemically different in that they comprise different elements or compounds or compositions). Candidate materials that are library members that have the same composition can also be considered different from each other if they have measurably different physical properties (e.g., thickness, crystalline structure, active surface area) or otherwise differ in form, and these differences impart different process-enhancing activity (e.g., electrocatalytic activity) to the two different candidate materials library members being compared. Also, the members of the libraries may be arrays of different materials at the various intermediate stages of the process described herein for preparation of the members of the library, including for example, libraries comprising for example: (i) different dispersions or suspensions provided or prepared as an array; (ii) such dispersions or suspensions having precipitated metals on the supports; (iii) different supported metal alloy precursors; (iv) different supported metal alloys or different supported metal-containing powders; (v) different frozen composites comprising metal species deposited on supports; and/or (vi) different freeze-dried powders.

An array of candidate materials generally comprises a library substrate and two or more different candidate materials that are library members, and preferably four or more different candidate materials at separate portions or regions of the library substrate. The candidate materials are spatially separated, preferably at an exposed surface of the library substrate, such that the array of materials may be integrated with various apparatus for various process steps. The candidate material library members preferably reside at, on or in (used interchangeably herein) the same common library substrate for more than one step in the preparation protocols as described herein, so that the common library substrate may be a universal common library substrate on which different candidate materials reside for at least two consecutive process steps, thereby eliminating a need to transfer library members off of the library substrate between such at least two consecutive process steps. Moreover, the different candidate materials are also preferably separately addressable, for example, for automated synthesis thereof (e.g., using automated synthesis handling robots under software control, such as Impressionist® automation software (Symyx Technologies, Inc., Santa Clara, Calif.)), or for automated analytical characterization thereof. The two or more different candidate materials are therefore preferably located at discrete, non-contiguous, individually addressable regions of the common library substrate, with the regions being spaced to accommodate inclusion into subsequent processing steps and apparatus. In some embodiments, however, the different candidate materials may, nonetheless, also be contiguous with each other (e.g., as in a continuous gradient of different material compositions).

The library substrate may be any material having a rigid or semi-rigid surface on which the candidate materials (i.e., library elements) may be formed or deposited or to which the candidate material may be linked. The library substrate may be of any suitable material, and preferably consists essentially of materials that are inert with respect to the chemical process of interest, and except where desired otherwise, with respect to the candidate materials being screened. Certain materials will, therefore, be less desirably employed as a substrate material for certain process conditions (e.g., low temperatures, including such ranges that are described elsewhere herein). Silicon, including polycrystalline silicon, single-crystal silicon, sputtered silicon, and silica ($SiO_2$) in any of its forms (quartz, glass, etc.), are exemplary substrate materials. Other known materials (e.g., silicon nitride, silicon carbide, metal oxides (e.g., alumina), mixed metal oxides, metal halides (e.g., magnesium chloride), minerals, zeolites, and ceramics) may also be suitable for a substrate material. Organic and inorganic polymers may also be suitably employed as library substrate materials in some applications of the invention.

As to form, the library substrate can, but does not necessarily, have at least one substantially flat, substantially planar surface, and is preferably, but not necessarily, a substantially planar substrate such as a wafer. The surface of the substrate may be divided into physically separate regions and can have, for example, dimples, wells, raised regions, etched trenches, or the like formed in the surface. In preferred embodiments, the supports used in the invention protocols may be placed or situated or deposited within such dimples or wells or within or upon other regions of the surface of the library substrate. Frits or caps may be used to hold such supports in place. The library substrate may be a porous or non-porous material. The substrate can in some embodiments be a passive library substrate, having an essential absence of any active components, such as valves, pumps, active heating elements, active mixing elements. Alternatively, the library substrate can, in some embodiments, have an essential absence of passive components, where such passive components comprise microfluidic channels or apertures used for fluid distribution, heat-transfer elements, mass-transfer elements (e.g., membranes), etc., or combinations thereof. In some embodiments, however, the substrate can include one or more of such active components, or such passive components.

In a preferred embodiment, the substrate has a substantially flat upper surface with a plurality of substantially coplanar indentations or wells of sufficient depth to allow a quantity of candidate material to be deposited, formed or contained therein. The overall size and/or shape of the substrate is not limiting to the invention. The size may be chosen, however, to be compatible with commercial availability, existing fabrication techniques (e.g., silicon wafer availability and/or fabrication), and/or analytical measurement techniques. Generally, the substrate will be sized to be portable by humans and/or to be manipulated by automated substrate-handling devices. Hence, two inch and three inch wafers are suitably employed, or microtiter plates (e.g., having a region density of not more than about 1 region per $cm^2$). The choice of an appropriate substrate material and/or form for certain applications will be apparent to those of skill in the art based on the guidance provided herein.

The number of different candidate materials as library members for a particular library (e.g., a library of dispersions or suspensions, or metal-containing powders resulting therefrom) is preferably a plurality; that is, preferably at least about 2 (i.e., two or more), more preferably at least about 4 (i.e., four or more), preferably at least about 5 (i.e., five or more), more preferably at least about 10 (i.e., ten or more), still more preferably at least about 25 (i.e., twenty-five or more), even more preferably at least about 50 (i.e., fifty or more), yet more preferably at least about 100 (i.e., one hundred or more), and most preferably at least about 250 (i.e., two hundred fifty or more). In some preferred embodiments, the number of candidate materials as library members may be about 8×N, about 16×N, about 48×N or about 96×N, where N ranges from about 1 to about 100, preferably from about 1 to about 20, more preferably from about 1 to about 10, and most preferably from about 1 to about 5. Known microscale and nanoscale fabrication techniques can also be used, however, to prepare arrays having an even greater number of different candidate materials. For higher throughput operations, for example, the number of different candidate materials may be at least about 1000 (i.e., one thousand or more), more preferably at least about 10,000 (i.e., ten thousand or more), even more preferably at least about 100,000 (i.e., one hundred thousand or more), and most preferably at least about 1,000,000 (i.e., one million or more), or more.

If the plurality of candidate material library members are to be deposited on distinct, individually addressable regions of the substrate, the separation between adjacent regions may range from about to about 5 μm to about 10 cm, preferably from about 50 μm to about 1 cm, more preferably from about 100 μm to about 1 cm. In some embodiments, the separation between adjacent regions may be even smaller, including ranging from about 100 μm to about 7 mm, and from about 1 mm to about 5 mm. Additionally, the inter-region spacings may be not more than about 10 cm, preferably not more than about 1 cm, or even smaller distances, including for example, not more than about 7 mm, not more than about 5 mm, not more than about 4 mm, not more than about 2 mm, not more 1 mm, not more than about 100 μm, and not more than about 50 μm.

As such, the surface density of discrete candidate material regions may range from about 0.1 region/cm$^2$ to about 500 regions/cm$^2$, or from 1 region/cm$^2$ to about 200 regions/cm$^2$, more preferably from about 5 regions/cm$^2$ to about 100 regions/cm$^2$, and in some cases from about 10 regions/cm$^2$ to about 50 regions/cm$^2$. Additionally, the planar surface density may be at least about 0.1 region/cm$^2$, at least about 1 region/cm$^2$, at least about 5 regions/cm$^2$, at least about 10 regions/cm$^2$, at least about 25 regions/cm$^2$, at least about 50 regions/cm$^2$, at least about 100 regions/cm$^2$, or at least about 200 regions/cm$^2$.

In this regard it is to be noted that, for some cases, lower or mid-range densities may be preferred. For other cases, higher densities may be suitable. Additionally, even higher densities may be achieved if fabrication technology involves nano-scale applications. As discussed elsewhere herein, the arrangement of the plurality of candidate materials (including separation and relative spatial address) and the plurality of regions is preferably correlated with the arrangement of the apparatus for preparation and/or subsequent analytical or characterization steps.

Preparing Combinatorial Libraries

Preferred approaches for forming an array of candidate materials as library members include the various specific protocols or methods, described in detail elsewhere herein, with respect to each element thereof (i.e., a dispersion or suspension, a support having a precipitate or deposit thereon, a freeze-dried powder or alloy, etc.).

However, it is to be generally noted that one or more of the steps in the methods disclosed or described herein, or specific aspects of such protocols, may be automated using known techniques, and specific library designs may be effected using approaches already known in the art of combinatorial materials research, including for example solution-based techniques disclosed in U.S. Pat. Nos. 5,985,356 and 6,004,617, each to Schultz et al., and in U.S. patent application Ser. No. 10/198,709 filed Jul. 17, 2002 by Giaquinta et al., each of which is incorporated by reference for all purposes. The combinatorial library that comprises the array of candidate materials is preferably designed with the assistance of library design software such as LIBRARY STUDIO® software (Symyx Technologies, Inc., Santa Clara, Calif.). Preparation of the arrays may be advantageously effected using automated liquid handling robots (e.g., CAVRO Scientific Instruments, Inc.), under control of software such as IMPRESSIONIST® software (Symyx Technologies, Inc.).

Solution of the Dispersion or Suspension

The solution in which the supports are dispersed or suspended provides the means for delivering the metal species or precipitated metal which is to be deposited onto the surfaces of the supports/particulate support. As set forth above, the metal species or precipitated metal may be the final desired form, but in many instances it is not. If the metal species/precipitated metal is not a final desired form, the deposited metal species or precipitated metal is referred to as a "precursor" of the final desired form. Examples of such precursors or metal species or precipitated metal include inorganic and organic metal compounds such as metal halides, sulfates, carbonates, nitrates, nitrites, oxalates, acetates, formates, etc. The conversion to the final desired form can be made by thermal decomposition, chemical reduction, or other reaction, using means known to one of ordinary skill in the art. Thermal decomposition, for example, is brought about by heating a precursor to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2-dichloroethane, N,N-dimethylformamide, formamide, etc.

A precursor or metal species or precipitated metal is usually selected such that any unwanted by-products from the conversion can be removed from the powder product. For example, during thermal decomposition the unwanted decomposition products are typically volatilized. Specifically, if the desired final product is an oxide, any precursor which yields a powder that can be freed of unwanted by-products by thermal oxidation may be used. Similarly, if the desired final product is a metal, any precursor which yields a powder that can be separated from unwanted by-products during a thermal reduction may be used. Still further, if the desired final product is an electrocatalyst metal alloy, the metal precursors are typically selected so that the powder comprising the deposited precursors may be reduced without significantly altering the uniformity of the metal deposits on the surface of the supports and/or without significantly altering the particle size of the final powder (e.g., through agglomeration).

Essentially, any metal may be deposited onto supports by the process of the present invention, provided that the metal or compound containing the metal is capable of being dissolved in a suitable medium (i.e., a solvent). Likewise, nearly any metal may be combined with, or alloyed with, any other metal provided the metals or the respective compounds are soluble in a suitable medium. By way of example, many compounds of the following metals are capable of being dissolved in a suitable solvent: copper, silver, gold, vanadium, cerium, tin, tungsten, chromium, molybdenum, rhenium, iron, cobalt, nickel, zinc, manganese, platinum, ruthenium, osmium, rhodium, iridium, palladium, platinum, zirconium, hafnium, titanium, and indium.

In one embodiment of the present invention the solute portion comprises an inorganic metal-containing compound as a source of the metal species being deposited. Examples of the inorganic-metal containing compound include indium (III) nitrate pentahydrate, manganese (II) nitrate, iron (III) nitrate nonahydrate, $(NH_4)Mo_7O_{24} \cdot 4H_2O$, ammonium paratungstate $((NH_4)_{10}W_{12}O_{41} \cdot 5H_2O)$, rhodium (III) nitrate, chromium (III) nitrate, zinc (II) nitrate hexahydrate, copper (II) nitrate, nickel (II) nitrate hexahydrate, and vanadium (IV) sulfate oxide. The foregoing compounds are highly soluble in water, and, as a result, water is often considered to be a preferred solvent. In some instances, it is desirable for an inorganic metal-containing compound to be dissolved in an acidic solution prior to being mixed with other inorganic metal-containing compounds. For example, rhodium and ammonium paratungstate may be dissolved in an aqueous nitric acid solution.

The solute portion may comprise organometallic compounds. In general, organometallic compounds are typically more costly, contain more impurities than inorganic metal-containing compounds, and require organic solvents. Organic solvents are more costly than water and typically require procedures and/or treatments to control or negate toxicity. As such, in some embodiments organometallic compounds and organic solvents may not be preferred.

To form an alloy having a particular composition or stoichiometry, the amounts of the various metal-containing source compounds necessary to achieve that composition are determined to prepare the solution(s). If the supports comprise a pre-deposited material such as a pre-deposited metal-containing compound and/or a pre-deposited metal in its metallic oxidation state deposited on the supports prior to performing the deposition method as detailed herein, the loading or amount of the metal in the pre-deposited material is typically taken into account when calculating the necessary amount(s) of metal-containing source compound(s). After the appropriate amount(s) of the metal-containing source compound(s) is (are) determined, the solution(s) may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. Thus, the relative amounts of the metal-containing source compounds are determined by the volumes of the source solutions added together to form the suspending solution. If, however, all the selected compounds are not soluble at the same temperature when mixed together (either as powders in a solvent or as source solutions), the temperature of the mixture may be increased to increase the solubility limit of one or more of the source compounds so that the suspending solution may be formed. For example, when adding a first source solution comprising $(NH_4)Mo_7O_{24} \cdot 4H_2O$ and $Rh(NO_3)_3$ in water to a second source solution comprising $Fe(NO_3)_3 \cdot 9H_2O$ in water, the solubility of the mixture may be incomplete and increasing the temperature of the mixture to, for example, about 100° C. enables the suspending solution to be formed. In addition to adjusting solubility with temperature, the stability of the suspending solution may be adjusted, for example, by the addition of a buffer, by the addition of a complexing agent, and/or by adjusting the pH.

In some situations, the combination of compounds necessary to form the desired deposit composition are incompatible and may result in the formation of an insoluble species upon being mixed. This incompatibility may occur when the compounds are mixed at all concentrations or within particular concentration ranges. Advantageously, the method of the present invention allows for forming deposits having the desired composition of metal species/precipitated metal despite the incompatibility. To form the deposits, the order in which the metal-containing compounds and supports are mixed together may be adjusted. Specifically, a first source solution may be mixed with the supports sufficiently to disperse or suspend (preferably uniformly throughout the first solution) and impregnate the supports with the first source solution and then a second source solution, and, if necessary, additional source solutions are added sequentially. Adding the second source solution after the supports have been dispersed or suspended allows the particles of the insoluble species that form upon mixing the solutions to deposit (e.g., precipitate) uniformly on the supports. What remains is a dispersion or suspension comprising the supports with deposits of the insoluble species thereon in a solution comprising the solvent portion and any remaining soluble compound(s) of the solute portion. The specifics of mixing a solution and the supports to form the suspension are set forth in detail below.

Alternatively, the incompatibility issue may be addressed by performing all or part of the method of the present of the invention more than once. For example, the method of the present invention may be performed to deposit on or more metals on the particulate support from a first solution. Then, after separating the particulate support from the first solution, the particulate support having thereon the precipitated metal(s) from the first solution may be dispersed in an a second solution comprising one or more dissolved metals to form a second dispersion. Heat may then be removed from the second dispersion to precipitate the dissolved metal(s) from the second solution onto the particulate support already having the precipitated metal(s) from the first solution. It is also possible that before dispersing the particulate support in the second or subsequent solution(s) the previously precipitated metal(s) may be reduced to their metallic state and/or alloyed.

In addition to varying the amounts of the various metals to form alloys having different compositions, the method of the present invention allows for a wide variation in the loading of the metal onto the supports. This is beneficial because it allows for the electrocatalytic activity of a supported metal alloy powder to be maximized. The loading may be controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is well below their solubility limits. For example, the total concentration of inorganic metal-containing compounds is typically between about 0.01 and about 5 M. Preferably, the total concentration of inorganic metal-containing compounds in the solution is between about 0.1 and about 1 M, or about 0.25 to about 0.75 M.

Concentrations below the solubility limit are used because it is desirable to maximize the loading of the supported metal alloy electrocatalysts without decreasing the surface area of the metal deposits. Depending, for example, on the particular composition, the size of the deposits, and the uniformity of the distribution of deposits on the supports, the loading may typically be between about 5 and about 60 weight percent. Preferably, the loading is between about 10 and about 50 weight percent. More preferably, the loading is between about 20 and 40 weight percent. Still more preferably, the loading is about 40 weight percent.

Supports

The supports or particular support upon which the metal species or precipitated metal is to be deposited may be of any size and composition that is capable of being dispersed or suspended in the solution during the removal of heat. The maximum size of the supports depends on several parameters including agitation of the suspension, density of the supports, specific gravity of the solution, and the rate at which heat is removed from the system. Although not necessary, the supports are preferably inert to the solution.

In one embodiment of the present invention, the supports are electrically conductive and are useful for supporting electrocatalytic compounds in electrochemical reaction cells (e.g., fuel cells). Such electrically conductive supports are typically inorganic, for example, carbon supports. However, the electrically conductive supports may comprise an organic material such as an electrically conductive polymer (see, e.g., in U.S. Pat. Appln. 2002/0132040 A1). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 m$^2$/g. It has been reported that satisfactory results are achieved using carbon black support particles having a high mesoporous area, e.g., greater than about 75 m$^2$/g (see, e.g., Catalysis for Low Temperature Fuel Cells Part 1: The Cathode Challenges, T. R. Ralph and M. P. Hogarth, Platinum Metals Rev., 2002,46, (1), p. 3-14). Experimental results to date indicate that a surface area that is between about 200 and about 1000 m$^2$/g is preferred. More preferably, the surface area of the carbon support particles is between about 300 and about 700 m$^2$/g. Still more preferably, the surface area of the carbon support particles is about 500 m$^2$/g.

As set forth elsewhere herein, the supports may have a pre-deposited material thereon, which may be, for example, a pre-deposited metal such as platinum, palladium, nickel, etc. In fact, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N.A., Inc., of Sommerset, N.J. an may be selected to have a particular loading of platinum. The amount of platinum loading is selected in order to achieve the desired stoichiometry of the supported metal alloy. Typically, the loading of platinum is between about 5 and about 60 weight percent. Preferably, the loading of platinum is between about 15 and 45 weight percent. The size (i.e., the maximum cross-sectional length) of the platinum deposits is typically less than about 20 nm. For example, the size of the platinum deposits may be less than about 10 nm, 5 nm, 2 nm, or smaller. Preferably, the size of the platinum deposits is between about 2 and about 3 nm. Experimental results to date indicate that a desirable supported platinum powder may be further characterized by having a platinum surface area of between about 150 and about 170 m$^2$/g (determined by CO adsorption), a combined carbon and platinum surface area of between about 350 and about 400 m$^2$/g (determined by $N_2$ adsorption), and an average support size that is between about 100 and about 300 nm.

In this regard it is to be understood, however, that although the above loading, deposit size and surface areas are given with respect to platinum on a carbon support, these numbers and/or ranges are also applicable to other metals and/or supports, and combinations thereof, that may be suitably employed in the present invention by one of ordinary skill in the art, without departing from the intended scope herein.

Formation of the Dispersion or Suspension

In accordance with the present invention the above-described solution and supports may be mixed to form a dispersion or suspension. The mixing may be accomplished by any appropriate method known to one of ordinary skill in the art. Exemplary methods of mixing by magnetic stirring, insertion of a stirring structure (e.g., a rotor), shaking, sonication, or a combination of the foregoing methods.

Provided that the supports can be adequately mixed with the solution, the relative amounts of supports and solution may vary over a wide range. For example, when preparing carbon supported metal electrocatalysts using an aqueous suspension comprising dissolved inorganic metal-containing compounds, the carbon supports typically comprise between about 1 and about 30 weight percent of the suspension. In order of increasing preference, the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension. In this regard it is to be noted that the above-referenced amounts of carbon supports in suspension may apply equally to other, non-carbon supports.

The relative amounts of supports and solution may also be described in terms of volumetric ratios. For example, the dispersion or suspension may have a volumetric ratio of support particles to solution or solvent that is at least about 1:10. Specifying a minimum volumetric ratio indicates that the volume of support particles may be increased relative to the volume of solution or solvent. As such, in order of increasing preference, the volume ratio of support particles to solution or solvent may be at least about 1:8, 1:5, or 1:2. Additionally, this volume ratio may range from about 1:10 to about 1:2, or from about 1:8 to about 1:5.

In one embodiment of the present invention the solution and supports are mixed using sonication at a power and for a duration sufficient to form a dispersion or suspension in which the pores of the supports are impregnated with the solution and/or the supports are uniformly distributed throughout the solution. If the dispersion or suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform distribution of supports in the solution is generally preferred, there may be circumstances in which a non-uniform distribution of supports in the solution is desirable.

Typically the uniformity of the distribution of particles in the dispersion or suspension is maintained throughout the removal of heat from the dispersion or suspension. This uniformity may be maintained by continuing the mixing of the dispersion or suspension as it is being cooled. The uniformity may, however, be maintained without mixing by the viscosity of the dispersion/suspension. The actual viscosity needed to uniformly suspend the particles depends in large part on the amount of supports in the dispersion or suspension and the size of the supports. To a lesser degree, the necessary viscosity depends on the density of the supports and the specific gravity of the solution. In general, the viscosity is typically sufficient to prevent substantial settling of the supports as the heat is being removed from the suspension to precipitate the deposits, and/or, if desired, until the dispersion/suspension is solidified by the freezing of the solution or solvent. The degree of settling, if any, may be determined, for example, by examining portions of the solidified or frozen suspension. Typically, substantial settling would be considered to have occurred if the concentration of supports in any two portions vary by more than about ±10%, or about ±5%. When preparing a carbon supported metal-containing powder, the viscosity of the suspension or dispersion is typically sufficient to prevent substantial settling for at least about 4 minutes. In fact, the viscosity of the supsension or dispersion may be sufficient to prevent substantial settling for at least about 10 minutes, at least about 30 minutes, at least about 1 hour, or even up to about 2 days. Typically, the viscosity of the dispersion or suspension is at least about 5,000 mPa.s (e.g., about 5,500 mPa.s, about 6,000 mPa.s, about 6,500 mPa.s, about 7,000 mPa.s, or even about 7,500 mPa.s).

Removing Heat from the Dispersion or Suspension

Heat is removed from the dispersion/suspension so that at least a part of the solute portion separates from the solvent portion and deposits (e.g., precipitates) a metal species or precipitated metal onto the supports and/or onto any pre-existing deposits (e.g., a pre-deposited metal and/or pre-deposited metal species formed, for example, by precipitation of incompatible solutes). If the concentration of supports in the suspension is sufficient (e.g., within the ranges set forth above) and enough heat is removed, nearly all of the metal species to be deposited (e.g., at least about 80%, about 85%, about 90%, about 95% or more) is separated from the solvent portion to form deposits (e.g., precipitates) comprising the metal species on the supports. In one embodiment the heat is removed to solidify or freeze the dispersion or suspension and form a composite comprising the supports/particulate support with deposits comprising the metal species or a precipitated metal on the supports or particulate support within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention the deposits of metal species are precursors of a metal alloy and the size of the metal species deposits is controlled such that the eventually formed metal alloy deposits are of size suitable for use as a fuel cell electrocatalyst (e.g., no greater than about 20 nm, 10 nm, 5 nm, or 2 nm in size, or smaller). As set forth above, control of the alloy deposit size is accomplished, at least in part, by maintaining a well impregnated and uniformly distributed suspension throughout the removal of heat from the system. Additionally, the control of the deposit size is accomplished by rapidly removing heat from the dispersion/suspension as the compound or compounds are depositing on supports.

The rapid heat removal may comprise cooling the dispersion or suspension from a temperature of at least about 20° C. to a temperature below the freezing point of the solvent at a rate of, for example, at least about 20° C./minute. In order of increasing preference, the heat removal comprises cooling the dispersion or suspension at a rate of at least about 30, about 40, about 50, about 60, about 70, about 80, about 90 or even about 100° C./minute. As such, the dispersion or suspension may be cooled at a rate that is between about 50 and about 100° C./minute or at a rate that is between about 60 and about 80° C./minute. Typically, removal of heat is at a rate that allows for the temperature of the suspension to be reduced from a temperature such as room temperature (about 20° C.) or higher (e.g., about 40, about 60, about 80, or even about 100° C.) to the freezing point of the solution or solvent within a relatively short period of time (e.g., not more than about 10, 5, or 3 minutes).

The heat may be removed from the dispersion or suspension by any appropriate method. For example, a container containing a volume of the dispersion or suspension may be placed within a refrigeration unit such as freeze-dryer, a volume of dispersion or suspension may be contacted with a cooled surface (e.g., a plate or container), a volume of dispersion or suspension in a container may be contacted with a cryogenic liquid. Advantageously, the same container may also be used during the formation of the dispersion and/or during the separation of solvent from deposited supports. In one embodiment a cover is placed over an opening of the container. Although the cover may completely prevent the escape of any matter from the container, the cover preferably allows for a gas to exit the container while substantially preventing the supports from exiting the container. An example of such a cover includes a stretchable film (e.g., PARAFILM) having holes that are, for example, less than about 500, 400, or 300 μm in size (maximum length across the hole).

In one embodiment the dispersion or suspension is cooled at a rate of at least about 20° C./minute by immersing or contacting a container containing the dispersion or suspension in or with a volume of cryogenic liquid within a cryogen container sized and shaped so that at least a substantial portion of its surface is contacted with the cryogenic liquid (e.g., at least about 50, 60, 70, 80, or 90 percent of the surface of the dispersion/suspension container). The cryogenic liquid is typically at a temperature that is at least about 20° C. below the freezing point of the solvent. Examples of suitable cryogenic liquids typically include liquid nitrogen, liquid helium, liquid argon, but even less costly media may be utilized. For example an ice water/hydrous calcium chloride mixture can reach temperatures down to about −55° C., an acetone/dry ice mixture that can reach temperatures down to about −78° C., and a diethyl ether/dry ice mixture that can reach temperatures down to about −100° C.

The container may be made of nearly any type of material, provided the material will withstand repeated uses without structural failure (e.g., resistant to thermal shock), does not contribute impurities to the suspension (e.g., resistant to chemical attack), and is thermally conductive. For example, plastic vials made from high density polyethylene may be used.

Separation of the Deposited Supports and the Solvent

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen or solidified suspension is freeze-dried to remove the solvent portion. The freeze-drying may be carried out in any appropriate apparatus such as a LABCONCO FREEZE DRY SYSTEM (Model 79480). Intuitively, one of skill in the art would typically maintain the temperature of the frozen suspension below the melting point of the solvent (i.e., the solvent is removed by sublimation) in order to prevent agglomeration of the supports. The process of the present invention may be carried out under such conditions. Surprisingly, however, it is not critical that solvent portion be prevented from melting. Specifically, it has been discovered that a free-flowing, non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion forms a free-flowing, non-agglomerated supported powder that comprises the supports/particulate support and deposits comprising one or more metal species or precipitated metals on the supports/particulate support.

Reduction and Alloying of Deposited Metal Precursor Compounds

If the deposited metal species or precipitated metal(s) is (are) the desired final deposit, then conversion is not necessary. However, in one embodiment of the present invention the desired final deposit is a metal at its metallic oxidation state or a metal alloy (in which the metals of the alloy are in their metallic oxidation states) and the deposited metal species or precipitated metal(s) is (are) considered to be a precursor or precursors. To accomplish the conversion from precursor to metal, the powder is typically heated in a reducing atmosphere (e.g., an atmosphere containing hydrogen and/or an inert gas such as argon) at a temperature sufficient to decompose the precursor.

The method of the present invention may be used to form deposits other than metals on the supports by adjusting the atmosphere to which the precursor compounds are exposed during the heat treatment. For example, if the desired deposits are oxides, the conversion may be accomplished by thermal decomposition in an oxidizing atmosphere. Similarly, if carbides or nitrides are the desired deposits, the conversion may be accomplished by thermal decomposition in a carburizing atmosphere (e.g., $CO_2$) or a nitriding atmosphere (e.g., $N_2$ and/or ammonia), respectively.

The temperature reached during the thermal treatment is typically at least as high as the decomposition temperature(s) for the precursor compound(s) and not so high as to result in degradation of the supports and agglomeration of the supports. Accordingly, the temperature may be between about 60° C. and about 1100° C., between about 100 and about 1000° C., between about 200 and about 800° C., or between about 400 and about 600° C. Organometallic compounds tend to decompose a lower temperatures (e.g., 200° C. and lower), whereas inorganic metal-containing compounds typically decompose at higher temperatures (e.g., between about 200 and 1000° C.). Typically, the temperature does not exceed about 1000° C., which is adequate for forming most metals, metal alloys, metal oxides, metal nitrides, and/or metal carbides.

The duration of the heat treatment is typically at least sufficient to substantially convert the precursor deposits to the desired state. In general, the temperature and time are inversely related (i.e., conversion is accomplished in a shorter period of time at higher temperatures and vice versa). At the temperatures typical for converting the inorganic metal-containing compounds to a metal alloy set forth above, the duration of the heat treatment is typically at least about 30 minutes (e.g., about 1, 2, 4, 6, or 8 hours, or longer). Preferably, the duration is between about 2 and about 7 hours, or between about 4 and about 6 hours.

Supported Powders

Figure 1:
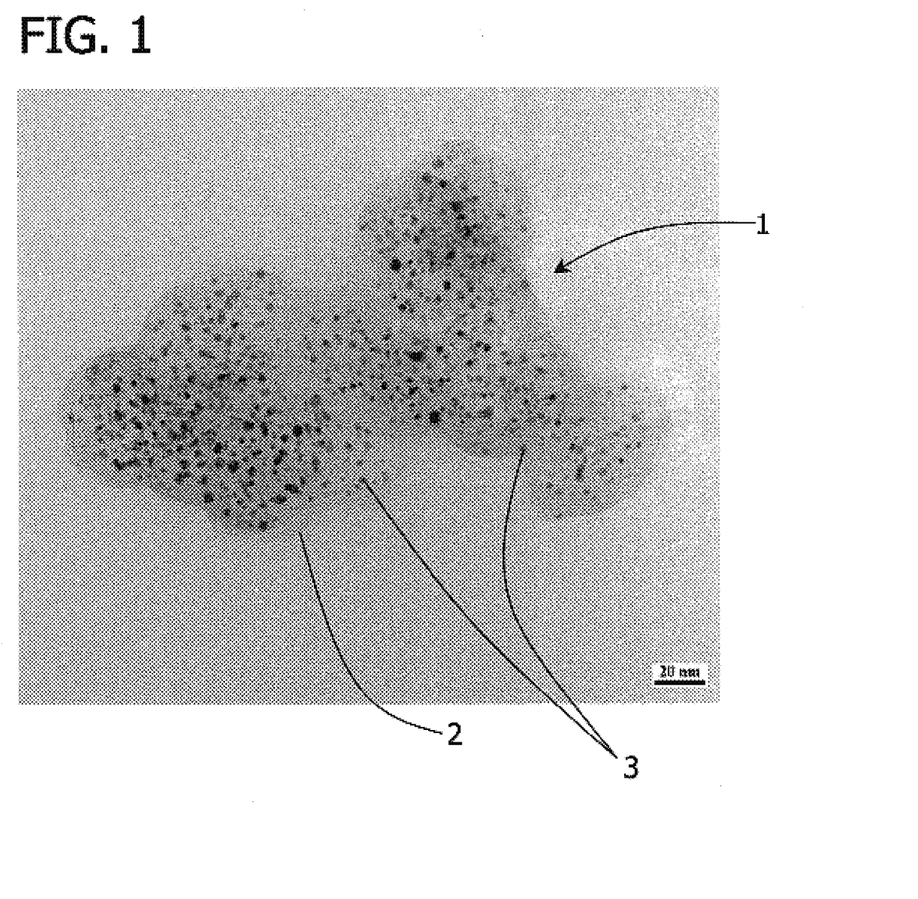
FIG. 1 is a TEM image of a carbon support with platinum alloy nanoparticles deposited thereon in accordance with an embodiment of the present invention.

Referring to FIG. 1, a carbon supported metal alloy electrocatalyst powder particle 1 produced in accordance with the method of the present invention comprises a carbon support 2 and deposits 3 of the metal alloy on the support. A particle and a powder comprising said particles may have a loading that is up to about 90 weight percent. However, when a supported metal powder is used as a fuel cell electrocatalyst, the loading is typically between about 5 and about 60 weight percent and is preferably between about 20 and about 40 weight percent. Increasing the loading to greater than about 60 weight percent does not typically result in an increase in the activity. Without being held to a particular theory, it is believed that excess loading covers a portion of the deposited metal and the covered portion cannot catalyze the desired electrochemical reaction. On the other hand, the activity of the supported metal electrocatalyst typically decreases significantly if the loading is below about 5 weight percent.

The method of the present invention may be used to produce supported metal alloy powders that are heavily loaded with nanoparticle deposits of a metal alloy that comprises one or more non-noble metals, wherein the deposits have a relatively narrow size distribution. For example, the supported non-noble metal-containing metal alloy powder may have a metal loading of at least about 20 weight percent of the powder, an average deposit size that is no greater than about 10 nm, and a deposit size distribution in which at least about 70 percent of the deposits are within about 50 and 150 percent of the average deposit size. Preferably, the metal loading is between about 20 and about 60 weight percent. More preferably, the metal loading is preferably between about 20 and about 40 weight percent. In one sub-embodiment the average size of the metal alloy deposits is no greater than about 5 nm. In another sub-embodiment the average size of the metal alloy deposits is no greater than about 2 nm. In yet another sub-embodiment the average size of the metal alloy deposits is between about 5 nm and about 10 nm. Preferably, the size distribution of the deposits is such that at least about 80 percent of the deposits are within about 75 and 125 percent of the average deposit size.

Benefits of the Dispersion- or Suspension-Freeze Embodiment

The method of the present invention results in improvements in the efficiency of preparing supported metal electrocatalyst powders and improvements to the powders themselves. The method allows for control of the stoichiometry of the deposits because the suspension is preferably kept within a single container, the solution is not physically separated from the supports (e.g., by filtration), and freezing results in substantially all of the solute precipitating on the supports. Additionally, the method of the present invention allows for the deposition of compounds which may not be deposited by other methods known in the art. The deposits formed by the present invention are isolated, small, and uniformly dispersed over the surface of the supports and tend to increase electrocatalytic activity. Still further, because filtering is not necessary, extremely fine particles are not lost and the supported metal powders produced by the present method tend to have a greater surface area and activity. Also, the act of depositing the metal species on the supports is fast. For example, immersing a container of the dispersion or suspension in a cryogenic liquid can solidify the dispersion or suspension in about three to four minutes.

It is to be noted that each of the aforementioned benefits may be synergistically applied to, and exploited through the application of, combinatorial methodologies as described and claimed here.

Definitions

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density $(A/cm^2)$.

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry, if more complete ordering occurs such as that which occurs between Pt metal and $Pt_3Fe$. Although the global arrangement of the atoms is extremely similar in both cases, the relationship between the locations of the Pt and Fe atoms is now ordered and not random resulting in different diffraction patterns. Further, a homogeneous alloy is a single compound comprising the constituent metals. A heterogeneous alloy comprises an intimate mixture of crystals of individual metals and/or metallic compounds. An alloy, as defined herein, is also meant to include materials which may comprise elements which are generally considered to be non-metallic. For example, some alloys of the present invention may comprise oxygen and/or carbon in an amount(s) that a generally considered to be a low or impurity level. (See, e.g., Structural Inorganic Chemistry, A. F. Wells, Oxford University Press, $5^{th}$ Edition, 1995, chapter 29.)

A dispersion is a two-phase system in which one phase consists of particles distributed throughout a bulk substance, the particles being the disperse or internal phase and bulk substance the continuous or external phase. The particles may be kept dispersed in the bulk substance by agitation. The particles may be kept dispersed in the bulk substance by the molecular motion in the surrounding medium and/or buoyancy. If this is the case, the dispersion is often referred to as a suspension.

EXAMPLES

Example 1

This Example generally illustrates one method by which electrocatalyst alloys on carbon support particles may be synthesized, in a batch-like format. First, a precursor solution comprising the desired metal atoms in the desired concentrations was formed. To prepare an alloy having a target composition of $Pt_{38}Rh_7Mo_{19}Ni_{36}$ on carbon support particles, the precursor solution was prepared by first dissolving about 0.017 g of $(NH_4)Mo_7O_{24}.4H_2O$ in about 5 ml $H_2O$. Next, about 0.054 g of $Ni(NO_3)_2.6H_2O$ was dissolved in the molybdate solution. Next, about 0.026 ml of a $Rh(NO_3)_3$ solution [about 10 wt % Rh solution in $HNO_3$] was added to the molybdate-nickel nitrate solution to yield a molybdate-nickel nitrate-rhodium nitrate solution that was clear and yellow-green in appearance.

The solution was then introduced into a HDPE (High Density Poly Ethylene) vial containing about 0.200 g of supported platinum powder which had a nominal platinum loading of about 19.2 percent by weight, resulting in a viscous suspension. The suspension was homogenized (i.e., the distribution of supported platinum powder in the precursor solution was substantially uniform) by immersing a probe of a BRANSON SONIFIER 150 into the vials and sonicating the mixture for about 1 minute at a power level of 3.

The vial containing the homogenous viscous suspension was then immersed, but not submersed, in a liquid nitrogen bath for about 3 minutes to freeze the liquid portion of the suspension. Specifically, the viscous suspension was cooled through contact with the interior surface(s) of the vial, not by directly contacting the liquid nitrogen as has been done by known spray-freezing methods. Freezing the liquid portion of the suspension (i.e., the precursor solution) forms a solid composite having a substantially uniform distribution of the particles having deposits of inorganic metal-containing compounds (i.e., rhodium-, molybdenum-, and nickel-containing precursor deposits) within a matrix of the solvent in a solid state.

The container of the frozen suspension (i.e., the composite) was then freeze-dried for about 24 hours. Specifically, the freeze-drying process was accomplished using a LABCONCO FREEZE DRY SYSTEM (Model 79480). The tray and the collection coil of the freeze dryer were maintained at about 26° C. and about −48° C., respectively, while evacuating the system (the pressure was maintained below about 0.2 millibar). The freeze-drying process removed the ice (frozen solvent or the matrix) leaving behind a freeze-dried powder comprising the supported platinum particles and rhodium-, molybdenum-, and nickel-containing precursor deposits thereon.

The freeze-dried powder was then subjected to a heat treatment to drive off the nitrogen, oxygen and waters of hydration associated with the deposited precursors, to reduce the metal ions of the precursors to metal atoms having a valence of zero, and to alloy said metal atoms with the platinum on the carbon black particles. One particular heat treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 700° C.; holding at about 700° C. for about 8 hours; and cooling down to room temperature. Another heat treatment was identical to the foregoing heat treatment except that the maximum temperature was about 900° C.

A second electrocatalyst alloy having a target composition of $Pt_{20}Rh_{20}Mo_{40}Fe_{20}$ was prepared on the carbon support particles. The method of preparing this electrocatalyst was identical except for the preparation of the solution. This solution was prepared first by dissolving about 0.070.g of $(NH_4)Mo_7O_{24}.4H_2O$ in about 3 ml $H_2O$. Then about 0.144 ml of a $Rh(NO_3)_3$ solution [about 10 wt % Rh solution in $HNO_3$] was added to molybdate solution to yield a molybdate-rhodium nitrate source solution that was clear and colorless in appearance. An iron nitrate source solution was prepared by dissolving about 0.080 g of $Fe(NO_3)_3.9H_2O$ in about 2 ml $H_2O$. The iron nitrate source solution was added to the molybdate-rhodium nitrate source solution and the combination was sealed in a vial and heated to about 100° C. for about 2 minutes to completely dissolve the sources solutions and form a molybdate-rhodium nitrate-iron nitrate solution that was clear and yellow-orange in appearance.

The actual compositions of the prepared supported electrocatalyst alloys were analyzed by EDS (Electron Dispersive Spectroscopy) elemental analysis by compressing samples of the powders into pellets having a diameter of 6 mm and a thickness of about 1 mm. The target alloy composition $Pt_{38}Rh_7Mo_{19}Ni_{36}$ had an actual composition of $Pt_{33}Rh_7Mo_{25}Ni_{35}$ and the target alloy composition $Pt_{20}Rh_{20}Mo_{40}Fe_{20}$ had an actual composition of $Pt_{19}Rh_{18}Mo_{46}Fe_{17}$. The method of the present invention produced actual compositions that were quite close to the target compositions in a first attempt. The slight differences observed between the targeted and the measured compositions are due to limitations of the EDS analysis technique.

Example 2

The method of the present invention was used to synthesize a combinatorial library of electrocatalyst $Pt_xCu_yCr_z$ alloys on carbon support particles. The combinatorial library was designed with the assistance of the LIBRARY STUDIO® software (Symyx Technologies, Inc., Santa Clara, Calif.). Each library was synthesized on a quartz substrate consisting of a quartz holder containing 12 (3×4 array) quartz crucibles. Initially, a powder handling robot was used to dispense 100 mg of supported platinum powder to each crucible. The powder had a nominal platinum loading of about 19.2 percent by weight. Four precursor solutions with two different concentrations comprising the two desired metal atoms were formed: a 0.05M (molarity) and a 1M solution of $Cu(NO_3)_2 \cdot 2.5H_2O$ and a 0.5M and a 1M solution of $Cr(NO_3)_2 \cdot 9H_2O$ were prepared in water. The appropriate amounts of these solutions were dispensed into the quartz crucibles that contained the supported platinum powder using automated liquid handling robots (CAVRO Scientific Instruments, Inc.), under control of the IMPRESSIONIST® software (Symyx Technologies, Inc.). The amount of each solution dispensed was calculated by the software to achieve the target alloy compositions indicated in the following table:

| Pt % | Cu % | Cr % | Pt loading (weight %) | Relative Performance |
| --- | --- | --- | --- | --- |
| 5 | 30 | 65 | 9.41 | 0.02 |
| 5 | 35 | 60 | 9.36 | 0.11 |
| 5 | 40 | 55 | 9.31 | 0.36 |
| 5 | 45 | 50 | 9.25 | 0.53 |
| 5 | 50 | 45 | 9.20 | 0.64 |
| 5 | 55 | 40 | 9.15 | 1.13 |
| 5 | 60 | 35 | 9.10 | 0.23 |
| 5 | 65 | 30 | 9.06 | 1.17 |
| 5 | 70 | 25 | 9.01 | 1.03 |
| 5 | 75 | 20 | 8.96 | 0.28 |
| 5 | 80 | 15 | 8.91 | 2.23 |
| 5 | 85 | 10 | 8.87 | 2.47 |
| 5 | 90 | 5 | 8.82 | 0.79 |
| 10 | 30 | 60 | 12.85 | 1.38 |
| 10 | 35 | 55 | 12.80 | 1.91 |
| 10 | 40 | 50 | 12.75 | 0.65 |
| 10 | 45 | 45 | 12.70 | 0.04 |
| 10 | 50 | 40 | 12.65 | 3.40 |
| 10 | 55 | 35 | 12.61 | 1.72 |
| 10 | 60 | 30 | 12.56 | 1.97 |
| 10 | 65 | 25 | 12.51 | 1.80 |
| 10 | 70 | 20 | 12.47 | 2.33 |
| 10 | 75 | 15 | 12.42 | 2.98 |
| 10 | 80 | 10 | 12.37 | 3.29 |
| 10 | 85 | 5 | 12.33 | 1.03 |
| 15 | 30 | 55 | 14.63 | 1.32 |
| 15 | 35 | 50 | 14.58 | 1.86 |
| 15 | 40 | 45 | 14.54 | 2.02 |
| 15 | 45 | 40 | 14.50 | 2.84 |
| 15 | 50 | 35 | 14.46 | 2.34 |
| 15 | 55 | 30 | 14.42 | 2.67 |
| 15 | 60 | 25 | 14.38 | 2.61 |
| 15 | 65 | 20 | 14.34 | 2.68 |
| 15 | 75 | 10 | 14.26 | 2.55 |
| 15 | 80 | 5 | 14.22 | 3.89 |
| 20 | 30 | 50 | 15.72 | 1.44 |
| 20 | 35 | 45 | 15.68 | 1.81 |
| 20 | 40 | 40 | 15.64 | 2.59 |
| 20 | 45 | 35 | 15.61 | 2.10 |
| 20 | 55 | 25 | 15.53 | 3.01 |
| 20 | 60 | 20 | 15.50 | 2.93 |
| 20 | 65 | 15 | 15.46 | 3.03 |
| 20 | 70 | 10 | 15.43 | 2.84 |
| 20 | 75 | 5 | 15.39 | 3.05 |
| 25 | 30 | 45 | 16.45 | 2.00 |
| 25 | 35 | 40 | 16.42 | 1.77 |
| 25 | 40 | 35 | 16.39 | 2.46 |
| 25 | 45 | 30 | 16.35 | 2.31 |
| 25 | 50 | 25 | 16.32 | 2.51 |
| 25 | 55 | 20 | 16.29 | 2.61 |
| 25 | 60 | 15 | 16.26 | 2.51 |
| 25 | 65 | 10 | 16.23 | 2.75 |
| 25 | 70 | 5 | 16.20 | 3.59 |
| 25 | 75 | 0 | 16.17 | 4.64 |
| 30 | 30 | 40 | 16.98 | 1.80 |
| 30 | 35 | 35 | 16.95 | 2.27 |
| 30 | 40 | 30 | 16.92 | 1.81 |
| 30 | 45 | 25 | 16.89 | 2.05 |
| 30 | 50 | 20 | 16.87 | 2.75 |
| 30 | 55 | 15 | 16.84 | 2.42 |
| 30 | 60 | 10 | 16.81 | 2.60 |
| 30 | 65 | 5 | 16.78 | 2.92 |
| 30 | 70 | 0 | 16.75 | 4.07 |
| 35 | 30 | 35 | 17.38 | 1.74 |
| 35 | 35 | 30 | 17.35 | 2.20 |
| 35 | 40 | 25 | 17.33 | 2.10 |
| 35 | 45 | 20 | 17.30 | 1.99 |
| 35 | 50 | 15 | 17.28 | 2.05 |
| 35 | 55 | 10 | 17.25 | 2.70 |
| 35 | 60 | 5 | 17.23 | 2.31 |
| 35 | 65 | 0 | 17.20 | 3.07 |
| 40 | 30 | 30 | 17.69 | 1.62 |
| 40 | 35 | 25 | 17.67 | 1.59 |
| 40 | 40 | 20 | 17.64 | 2.20 |
| 40 | 45 | 15 | 17.62 | 2.64 |
| 40 | 50 | 10 | 17.60 | 2.60 |
| 40 | 55 | 5 | 17.58 | 2.30 |
| 45 | 30 | 25 | 17.94 | 0.98 |
| 45 | 35 | 20 | 17.92 | 0.87 |
| 45 | 40 | 15 | 17.90 | 1.74 |
| 45 | 45 | 10 | 17.88 | 1.25 |
| 45 | 50 | 5 | 17.86 | 1.70 |
| 50 | 30 | 20 | 18.15 | 1.56 |
| 50 | 35 | 15 | 18.13 | 1.54 |
| 50 | 40 | 10 | 18.11 | 1.02 |
| 50 | 45 | 5 | 18.09 | 0.94 |

After the addition of the solutions to the crucibles, the suspensions were homogenized (i.e., the distribution of supported platinum powder in the solutions was substantially uniform) by immersing a probe of a BRANSON SONIFIER 150 into the crucibles and sonicating the mixture for about 1 minute at a power level of 3. The probe was immersed in each crucible using an automated robot (CAVRO Scientific Instruments, Inc.), and the probe was automatically washed between each immersion.

The crucibles containing the homogenous, viscous suspensions were then contacted, but not submersed, in a liquid nitrogen bath for about 3 minutes to freeze the liquid portion of the suspension. Specifically, viscous suspensions were cooled through contact with the interior surface(s) of the crucibles, not by directly contacting the liquid nitrogen. Freezing the liquid portion of the suspensions (i.e., the solution) results in the formation of a solid composite having a substantially uniform distribution of the particles having deposits of inorganic metal-containing compounds (i.e., copper and chromium-containing precursor deposits) within a matrix of the solvent in a solid state.

The quartz holder with each of the frozen suspensions (i.e., the composites) was then freeze-dried for about 24 hours. Specifically, the freeze-drying process was accomplished using a LABCONCO FREEZE DRY SYSTEM (Model 79480). The tray and the collection coil of the freeze dryer were maintained at about 26° C. and about −48° C., respectively, while evacuating the system (the pressure was maintained below about 0.2 millibar). The freeze-drying process removed the ice (frozen solvent or the matrix), leaving behind freeze-dried powders comprising the supported platinum particles and copper and chromium precursor deposits thereon.

The freeze-dried powders were then subjected to a heat treatment to drive off the nitrogen, oxygen and waters of hydration associated with the deposits, to reduce the metal ions of the deposits to metal atoms having a valence of zero, and to alloy said metal atoms with the platinum on the carbon black particles. One particular heat-treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 950° C.; holding at about 950° C. for about 10 hours; and cooling down to room temperature.

The actual compositions of representative samples of supported electrocatalyst alloys were analyzed by EDS (Electron Dispersive Spectroscopy) elemental analysis. The results indicated that the present invention produced compositions that were quite close to the target compositions in a first attempt.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

What is claimed is:

1. A combinatorial library of supported platinum alloy powders, the combinatorial library comprising an array, the array comprising a plurality of supported platinum alloy powder members at spatially discrete regions of a common library substrate, each of the plurality of supported platinum alloy powder members comprising a particulate support and deposits of a platinum alloy on the particulate support, wherein (a) the platinum alloy comprises a non-noble metal, (b) the loading of the deposits on the particulate support for each member is at least about 20 weight percent, (c) the average size of the deposits for each member is no greater than about 10 nm, (d) the deposits for each member have a size distribution wherein at least about 70 percent of the platinum alloy deposits are between about 50 and about 150 percent of the average platinum alloy deposit size; and (e) the plurality of supported platinum alloy powder members differ from each other with respect to one or more characterizing features selected from the group consisting of: (i) chemical or physical properties of the particulate support; (ii) chemical or physical properties of the platinum alloy on the particulate support; (iii) the extent of loading of the deposits on the particulate support; and (iv) the average deposit size on the particulate support.

2. The library of claim 1 wherein the particulate support for each of the supported platinum alloy powder members has an average size of at least about 100 nm.

3. The library of claim 1 wherein the particulate support for each of the supported platinum alloy powder members has an average size that is between about 200 and about 300 nm.

4. The library of claim 1 wherein the common library substrate is a microtiter plate comprising spatially discrete regions defined by wells having a region density of not more than about one region per $cm^2$.

5. The library of claim 1 wherein the common library substrate comprises spatially discrete regions having a region density of not more than about one region per $cm^2$.

6. The library of claim 1 wherein said plurality of supported metal-containing powder members comprises at least about 5 powder members.

7. The library of claim 1 wherein the loading of the deposits on the particulate support for each member is between about 20 and about 60 weight percent of the particulate support.

8. The library of claim 1 wherein the loading of the deposits on the particulate support for each member is between about 20 and about 40 weight percent of the particulate support.

9. The library of claim 1 wherein the average deposit size on the particulate support for each member is no greater than about 5 nm.

10. The library of claim 1 wherein the average deposit size on the particulate support for each member is no greater than about 2 nm.

11. The library of claim 1 wherein the average deposit size on the particulate support for each member is between about 5 and about 10 nm.

12. The library of claim 1 wherein the deposit size distribution is such that at least about 80 percent of the platinum alloy deposits are between about 75 and about 125 percent of the average platinum alloy deposit size.

* * * * *